US009307410B2

(12) United States Patent
Smereka et al.

(10) Patent No.: US 9,307,410 B2
(45) Date of Patent: Apr. 5, 2016

(54) SYSTEM AND METHOD FOR CONTROLLED WIRELESS UNLOCKING OF APPLICATIONS STORED ON A VEHICLE ELECTRONICS SYSTEM

(71) Applicant: Myine Electronics, Inc., Ferndale, MI (US)

(72) Inventors: Scott W. Smereka, Warren, MI (US); Donald J. Ebben, Novi, MI (US); Jacob R. Sigal, Ferndale, MI (US)

(73) Assignee: MYINE ELECTRONICS, INC., Ferndale, MI (US)

( * ) Notice: Subject to any disclaimer, the term of this patent is extended or adjusted under 35 U.S.C. 154(b) by 7 days.

(21) Appl. No.: 14/258,341

(22) Filed: Apr. 22, 2014

(65) Prior Publication Data
US 2014/0342726 A1 Nov. 20, 2014

Related U.S. Application Data

(60) Provisional application No. 61/823,973, filed on May 16, 2013.

(51) Int. Cl.
*H04M 3/00* (2006.01)
*H04M 1/00* (2006.01)
(Continued)

(52) U.S. Cl.
CPC .............. *H04W 12/08* (2013.01); *H04W 4/001* (2013.01); *H04L 67/12* (2013.01); *H04M 1/6091* (2013.01); *H04W 4/008* (2013.01)

(58) Field of Classification Search
CPC ....... H04W 4/00; H04W 4/003; H04W 4/046; H04W 12/08; H04W 8/183; H04W 8/22; H04W 12/10; H04W 4/008; H04W 88/02; H04M 1/72577; H04M 2250/10; H04M 2250/12; H04M 1/673; H04M 1/72519; H04M 1/67
USPC .............. 701/31.5, 49, 29.6, 31.4, 31.9, 32.1, 701/32.2, 32.4, 32.5, 32.7, 36, 48, 46, 441, 701/468; 705/14.11, 14.12, 14.14, 14.25, 705/14.35, 14.36, 14.37; 455/418, 420, 455/550.1
See application file for complete search history.

(56) References Cited

U.S. PATENT DOCUMENTS 6,484,088 B1 11/2002 Reimer
6,988,033 B1 1/2006 Lowrey et al.
(Continued)

OTHER PUBLICATIONS

Kermit Whitfield, "A hitchhiker's guide to the telematics ecosystem," Automotive Design & Production, Oct. 2003, http://findarticles.com, pp. 103.
(Continued)

*Primary Examiner* — Inder Mehra
(74) *Attorney, Agent, or Firm* — Harness, Dickey & Pierce, P.L.C.

(57) ABSTRACT

A method is disclosed which involves using an identifier which may be stored in an electronic component of a vehicle. A short range, wireless protocol connectivity system of the vehicle may establish a wireless link with a personal electronic device (PED) of a user when the user enters the vehicle with the PED powered on. The link may be used to automatically transmit the identifier to the PED. The PED then transmits the identifier to a remote authorization source which checks if the identifier is valid and, if so, sends an unlock code back to the PED. The PED uses the unlock code to unlock an application on the PED which enables access to the remote content source.

20 Claims, 2 Drawing Sheets

(51) Int. Cl.
*H04W 12/08* (2009.01)
*H04W 4/00* (2009.01)
*H04L 29/08* (2006.01)
*H04M 1/60* (2006.01)

(56) References Cited

U.S. PATENT DOCUMENTS

| | | | |
|---|---|---|---|
| 7,398,147 | B2 | 7/2008 | Kozarekar et al. |
| 7,925,426 | B2 | 4/2011 | Koebler et al. |
| 8,050,856 | B2 | 11/2011 | Duty et al. |
| 8,116,915 | B2 | 2/2012 | Kempton |
| 8,676,640 | B2 * | 3/2014 | ONeill et al. ............ 705/14.12 |
| 2004/0034460 | A1 | 2/2004 | Folkerts et al. |
| 2004/0093264 | A1 | 5/2004 | Shimizu |
| 2004/0094912 | A1 | 5/2004 | Niwa et al. |
| 2005/0021205 | A1 | 1/2005 | Niwa et al. |
| 2005/0228553 | A1 | 10/2005 | Tryon |
| 2006/0287798 | A1 | 12/2006 | Inoue et al. |
| 2007/0027593 | A1 | 2/2007 | Shah et al. |
| 2008/0059035 | A1 | 3/2008 | Siddiqui et al. |
| 2008/0295586 | A1 | 12/2008 | Fosseen |
| 2009/0082917 | A1 | 3/2009 | Adachi |
| 2009/0099724 | A1 | 4/2009 | Kranz et al. |
| 2010/0262321 | A1 | 10/2010 | Daum et al. |
| 2010/0324752 | A1 | 12/2010 | Suganuma et al. |
| 2011/0022197 | A1 | 1/2011 | Kultgen, II |
| 2011/0046834 | A1 | 2/2011 | Grider et al. |
| 2011/0054768 | A1 | 3/2011 | Sullivan |
| 2011/0106375 | A1 * | 5/2011 | Gurusamy Sundaram ..... 701/33 |
| 2011/0130905 | A1 | 6/2011 | Mayer |
| 2011/0166739 | A1 | 7/2011 | Oesterling |
| 2011/0166773 | A1 | 7/2011 | Raz et al. |
| 2011/0234427 | A1 * | 9/2011 | Ingram et al. ............. 340/995.1 |
| 2011/0313647 | A1 | 12/2011 | Koebler et al. |
| 2013/0143631 | A1 * | 6/2013 | Platzer ............... 463/6 |
| 2013/0317693 | A1 * | 11/2013 | Jefferies et al. ............ 701/31.5 |
| 2014/0067208 | A1 * | 3/2014 | Klappert et al. ............. 701/49 |
| 2014/0181325 | A1 * | 6/2014 | Hundal et al. ................. 710/5 |
| 2015/0311935 | A1 * | 10/2015 | Witkowski ............ G07C 5/008 455/39 |

OTHER PUBLICATIONS

Ford Motor Company, "SYNC with Navigation System," Owner's Guide Supplement, SYNC System Version 1 (Jul. 2007).
Ford Motor Company, "SYNC with Navigation System," Owner's Guide Supplement, SYNC System Version 2 (Oct. 2008).
Ford Motor Company, "SYNC with Navigation System," Owner's Guide Supplement, SYNC System Version 3 (Jul. 2009).
Ford Motor Company, "SYNC," Owners's Guide Supplement, SYNC System Version 1 (Nov. 2007).
Ford Motor Company, "SYNC," Owner's Guide Supplement, SYNC System Version 2 (Oct. 2008).
Ford Motor Company, "SYNC," Owner's Guide Supplement, SYNC System Version 3 (Aug. 2009).

* cited by examiner

SYSTEM AND METHOD FOR CONTROLLED WIRELESS UNLOCKING OF APPLICATIONS STORED ON A VEHICLE ELECTRONICS SYSTEM

CROSS-REFERENCE TO RELATED APPLICATIONS

This application claims the benefit of U.S. Provisional Application No. 61/823,973, filed on May 16, 2013. The entire disclosure of the above application is incorporated herein by reference.

FIELD

The present disclosure relates to systems and methods for controlling the unlocking and use of applications and features stored on an electronics subsystem, such as an electronics subsystem of a motor vehicle, and more particularly to a system and method for controlling the wireless unlocking of applications and features through a short range wireless connection between a subsystem of the vehicle and a user's smartphone.

BACKGROUND

The statements in this section merely provide background information related to the present disclosure and may not constitute prior art.

It is becoming more and more common for motor vehicle manufacturers to offer various services, applications and features for use with their vehicles. Sirius XM™ satellite radio is just one such example. Music streaming services are another example. However, before a user may make use of the service/application or feature, the user typically must obtain the involvement of a vehicle dealership or possibly that of the service/application/feature provider. More typically the user may be required to present some proof of ownership of the vehicle in order to obtain some type of unlocking code from a premium content service before the application/service/feature can be activated. As such, typically there is some involvement of the user that is required to activate the application/service/feature. This can contribute to providing a negative user experience if the user has difficulty obtaining the needed authorization code, and/or must spend his/her own time in going through one or more procedures to activate the application/service/feature. This also may require added involvement and time from the vehicle dealer if additional action is needed by the vehicle dealer to configure the vehicle radio system to allow the application/service/feature.

SUMMARY

In one aspect the present disclosure relates to a method for enabling seamless user access to restricted content, via a wireless connection with a remote content source, for use by a user within a vehicle. In one implementation the method may include storing an identifier in an electronic component of the vehicle. A short range, wireless protocol connectivity system may be used, which is associated with the vehicle, to establish a wireless, short range communications link with a personal electronic device (PED) of the user when the user enters the vehicle with the PED powered on. The short range communications link may be used to automatically transmit the identifier to the PED. The PED may be used to transmit the identifier to a remote authorization source, and the remote authorization source may be used to check to determine if the identifier is valid. If the identifier is valid, the authorization source may send an unlock code back to the PED. The unlock code is used by the PED to unlock an application on the PED which enables the application to access and make use of content from the remote content source.

In another aspect the present disclosure relates to a method for enabling seamless user access to restricted content, via a wireless connection with a remote content source, for use by a user within a vehicle. The method may include storing an identifier in an electronic component of the vehicle. A system may be used which is associated with the vehicle to establish a communications link with a personal electronic device (PED) of the user after the user enters the vehicle with the PED powered on. The communications link may be used to automatically transmit the identifier to the PED, the identifier having a limited time period associated therewith during which the identifier is valid. The PED may be used to transmit the identifier via a network to a remote, cloud-based authorization source. The remote, cloud based authorization source may be used to check to determine if the identifier is valid, and if so, to send an unlock code back to the PED via the network. The PED may be then be caused to use the unlock code to enable an application on the PED to access and make use of predetermined content from the remote content source while the PED is present in the vehicle and being operated within the vehicle.

In still another implementation the present disclosure relates to a system for enabling seamless user access to restricted content, via a wireless connection with a remote content source, by a user within a vehicle. The system may comprise a carryable personal electronic device (PED) that a user may use to access cloud-based subsystems. An identifier may be used which is stored in an electronic component of the vehicle. A short range, wireless protocol connectivity system associated with the vehicle may be included to automatically establish a wireless, short range communications link with the PED of the user when the user enters the vehicle with the PED powered on. The short range communications link may automatically transmit the identifier to the PED. The PED may further be configured to transmit the identifier to a remote authorization source and to receive an unlock code back from the remote authorization source if the authorization code determines that the authorization code is valid. The PED may further be configured to use the unlock code to unlock an application on the PED which enables the application to access and make use of content from the remote content source.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
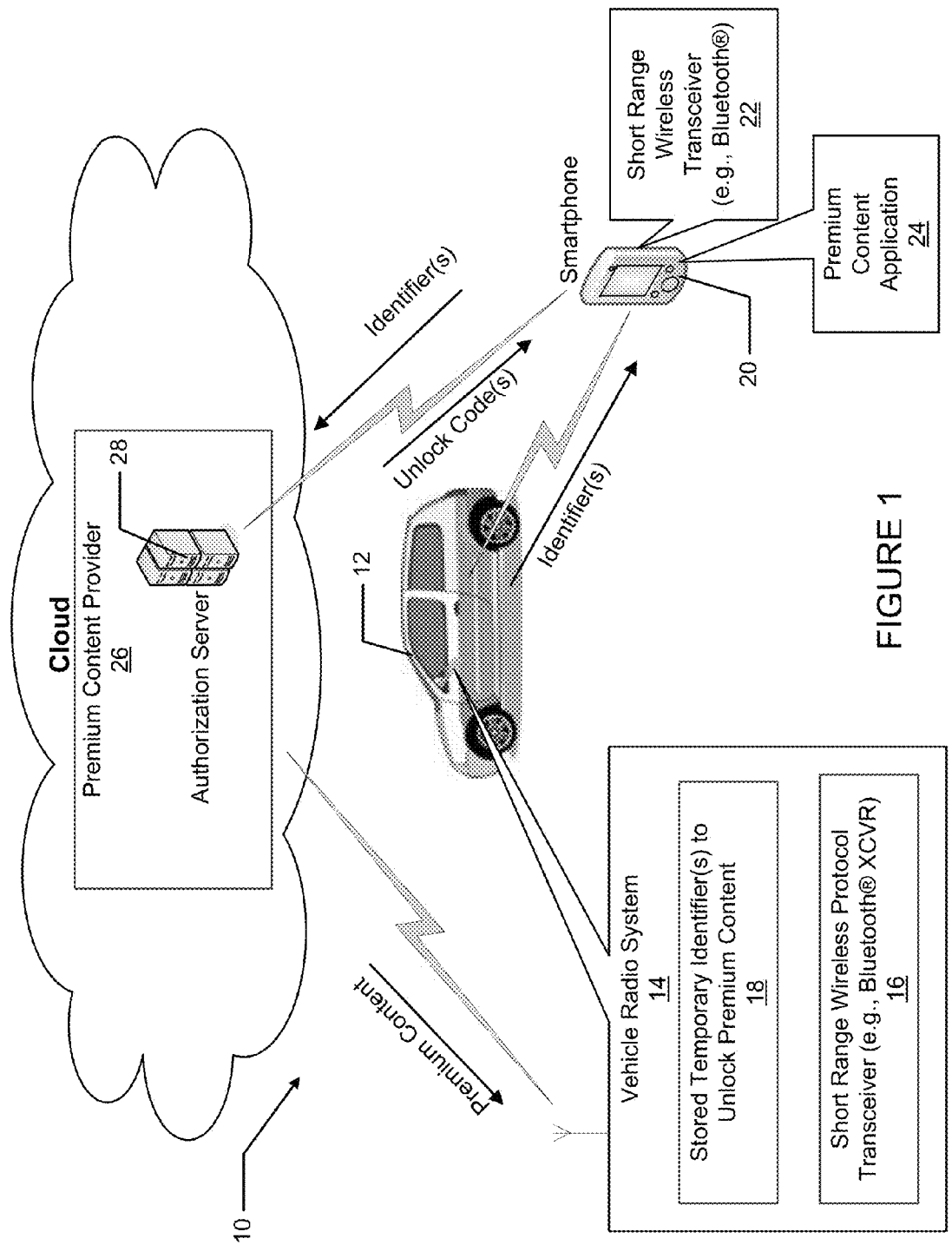
FIG. 1 is a highly simplified block diagram of a system in accordance with one embodiment of the present disclosure for automatically, seamlessly and wirelessly unlocking a stored application/service/feature on a user's smartphone.

The following description is merely exemplary in nature and is not intended to limit the present disclosure, application, or uses. It should be understood that throughout the drawings, corresponding reference numerals indicate like or corresponding parts and features.

Referring to FIG. 1, there is a system 10 in accordance with one embodiment of the present disclosure. The system 10 makes use of a vehicle 10, in this example a motor vehicle 12 such as an automobile, which has a radio system 14. The radio system 14 has a short range wireless protocol transceiver 16, for example (and without limitation) a Bluetooth® protocol wireless transceiver or a ZigBee wireless protocol transceiver. One or more unique identifiers 18 for unlocking a premium content service or application may also be stored in a suitable memory of the vehicle radio system 14 or elsewhere in the vehicle's electronics. For the purpose of the following examples, it will be assumed that a single unique identifier is being stored, although more than one could just as readily be stored to provide added security. The stored unique identifier may be the VIN of the vehicle 12, a MAC address on a USB driver or Bluetooth® wireless protocol card, or any other unique identifier. This identifier may be stored in the vehicle's radio system 14 or elsewhere in the vehicle's electronics when the vehicle is being built or even thereafter by a vehicle dealership.

A user may use her/his smartphone 20, which has its own short range wireless transceiver 22 (e.g., Bluetooth transceiver or ZigBee transceiver) and a premium content application 24 stored on the smartphone, to communicate with the vehicle radio system 14. More specifically, the smartphone 20 may use the short range wireless protocol link that is automatically and seamlessly established between the short range wireless transceivers 16 and 22 to obtain the stored identifier 18. The smartphone 18 may then forward the identifier 18 via a wireless signal to an authorization server 28 associated with a premium content provider 26. The authorization server 28 contains identifiers (e.g., VINs, MAC addresses, etc.) that indicate when a vehicle is authorized to obtain the premium content. The identifier may be initially set by the vehicle manufacturer to correspond to a limited time, for example six months from a date on which the vehicle 12 is sold or leased to the user. When the authorization server 28 is provided the identifier by the smartphone 20, it checks its stored database of identifiers to determine if the identifier is valid. If so, it provides one or more "unlock" codes to the smartphone 20 that the smartphone may use to unlock the premium content application 24 and allow the user to begin using the premium content. These actions take place seamlessly and without any action by the user. Essentially, as soon as the user enters the vehicle 12 with her/his smartphone 20 turned on, the unlocking operations described above begin and are carried out. There is no need for the user to present any purchase information to the premium content provider 26, and no need for the personnel at the vehicle dealership to instruct the user as to how to unlock the premium content application 24. And while the authorization server 28 is shown as a Cloud based component, it will be appreciated that this is just intended to be one example of where the authorization server may be located.

Figure 2:
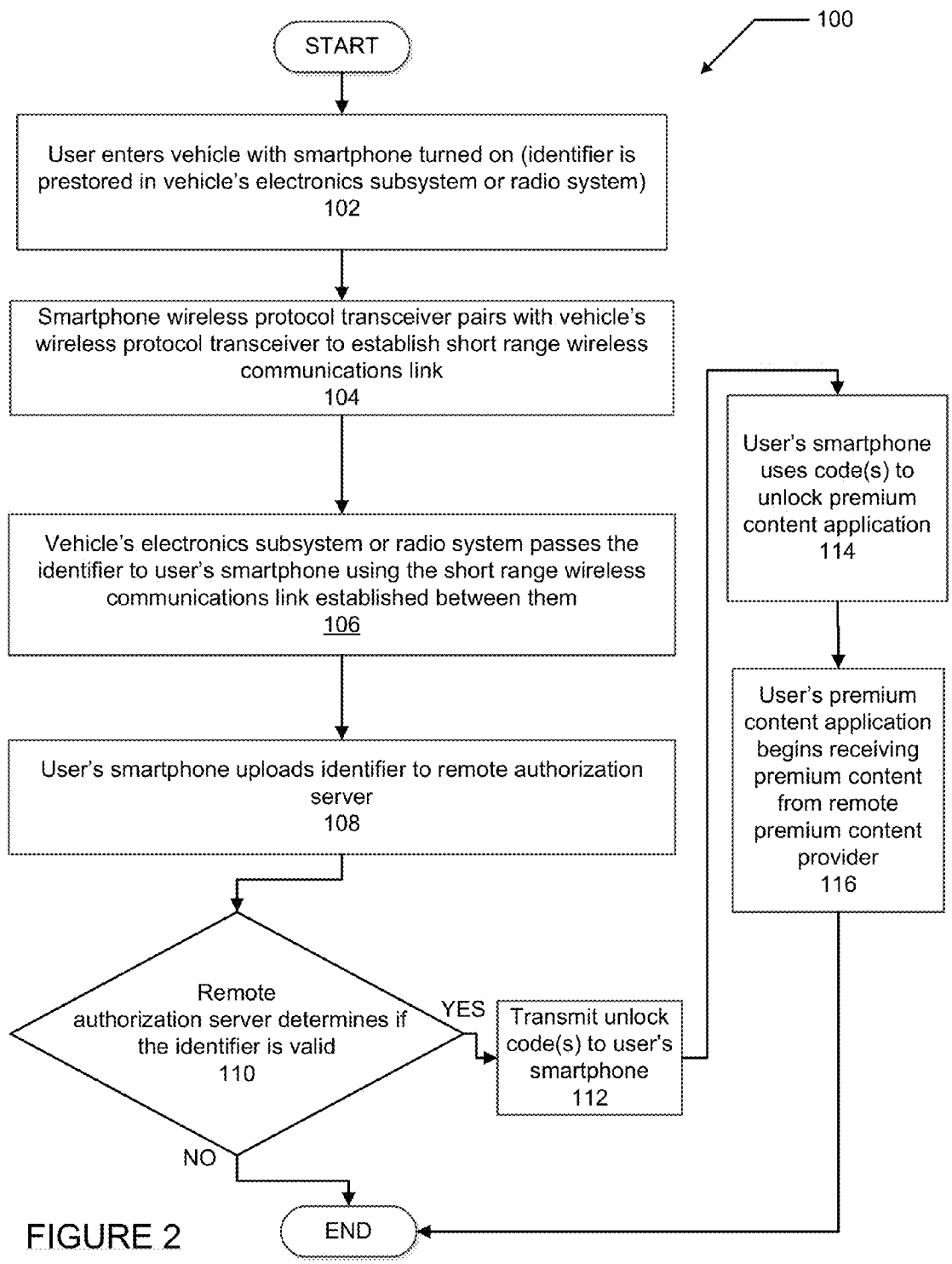
FIG. 2 is a flowchart illustrating one example of a sequence of operations of the system of FIG. 1.

Referring briefly to FIG. 2, a flowchart 100 is shown that sets forth one example of the sequence of operations that may take place in using the system 10. At operation 102 the user may enter her/his vehicle with her/his smartphone 20 turned on. At operation 104 the vehicle's wireless protocol transceiver 16 pairs with the short range wireless transceiver 22 of the smartphone to establish a short range wireless link between the two components. At operation 106 the vehicle's electronics subsystem or radio system 14 passes the stored identifier 18 to the user's smartphone 20 using the short range wireless communications link established between them. At operation 108 the user's smartphone 20 uploads the identifier to the remote authorization server 28. At operation 110 the remote authorization server 28 determines if the identifier is valid. If not, the sequence of operations performed by the system 10 ends. If the identifier is determined to be valid, then the authorization server 28 transmits one or more unlock codes back to the user's smartphone 20, as indicated at operation 112. At operation 114 the user's smartphone 20 uses the unlock code(s) to unlock the premium content application 24 stored on the smartphone. At operation 116 the premium content application 24 begins receiving premium content from the remote premium content provider 26.

As another example, consider a vehicle manufacturer that wishes to provide a promotion to an owner of one of its vehicles. The vehicle owner may be sent an email by the manufacturer announcing that the owner will be provided with an upgrade to a premium version of the ABC Music Streaming application for a three month trial period. The user may then download the basic ABC Music Streaming application onto her/his smartphone 20. The next time the owner enters the vehicle with her/his smartphone 20 turned on and opens the basic ABC Music Streaming application, the Bluetooth® (or ZigBee, etc.) wireless protocol communications link between the vehicle's radio short range wireless protocol transceiver 16 and the smartphone's transceiver 22 will be established. This communications link allows the identifier 18 to be passed to the owner's smartphone 20. The owner's smartphone then forwards the identifier 18 to the authorization server 28. If the identifier is authenticated/verified by the authorization server 28, then the unlock code(s) will be sent by the authorization server 28 (or some other component instructed to do so) back to the smartphone 20. The unlock code(s) is/are then used by the ABC Music Streaming application to unlock it's premium features and the application, operating with its premium features, is made available to the owner for use while the owner is operating the vehicle 12. In this example, just like the example of flowchart 100, the actions of checking to determine if the identifier is valid and providing the unlock code(s) to the owner's smartphone 20 happen seamlessly and without any specific actions to needing to be taken by the owner.

From the foregoing it will be appreciated that a significant benefit of the system 10 and method described herein is that no actions need to be taken by the user in unlocking the premium content application on her/his smartphone. This action happens seamlessly and automatically without any physical actions needing to be taken by the user as soon as the user enters the vehicle with her/his smartphone 20 turned on. This provides a highly efficient and convenient method for both the vehicle seller and the user to begin experiencing the premium content that is being provided, at least on a limited basis, with the purchase or lease of her/his vehicle.

While the premium content application has been described in the above examples as an "application", it will be appreciated that the teachings provided herein could be applied to any service or otherwise locked capability. Moreover, while this capability has been described as being provided in connection with an automobile, the present disclosure is applicable to any scenario where one party wishes to be able to provide limited premium content to another party via a smartphone, while the user uses a given product. The present teachings will therefore be applicable to vans, trucks, boats and other water craft, as well as any other recreational vehicle. The premium content could also be used in connection with other electronic appliances such as televisions and other personal electronic devices whose performance could be augmented by the use of some form of premium program or service.

The present system and method also makes it easy for application companies to set up free trial periods with vehicle OEMs or the manufacturers of other types of products that may be used in connection with premium content or a premium service. In this manner, user's may potentially be exposed to various types of premium content that they would ordinarily not have made the effort to try out, were it not for the automatic and seamless unlocking provided by the present system and method.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A method for enabling seamless user access to restricted content, via a wireless connection with a remote content source, for use by a user within a vehicle, the method including:
   storing an identifier in an electronic component of the vehicle, the identifier identifying that a user of the vehicle is allowed access to the restricted content, and the identifier being unrelated to the user of the vehicle;
   using a short range, wireless protocol connectivity system associated with the vehicle to establish a wireless, short range communications link with a personal electronic device (PED) of the user when the user enters the vehicle with the PED powered on;
   using the short range communications link to automatically transmit the identifier to the PED;
   using the PED to transmit the identifier to a remote authorization source;
   using the remote authorization source to check to determine if the identifier is valid, and if so, to send an unlock code back to the PED; and
   causing the PED to use the unlock code to unlock an application on the PED which enables the application to access and make use of content from the remote content source.

2. The method of claim 1, wherein the operation of storing an identifier in an electronic component of the vehicle comprises storing an identifier in a radio system of the vehicle.

3. The method of claim 1, wherein the operation of establishing a wireless, short range communications link with a personal electronic device (PED) of the user comprises establishing a wireless, short range communications link with a smartphone of the user.

4. The method of claim 1, wherein contacting the remote authorization source comprises contacting a remote authorization server.

5. The method of claim 1, wherein the remote authorization source is a cloud-based authorization server.

6. The method of claim 1, wherein the remote content source is a cloud-based remote content source.

7. The method of claim 1, wherein the identifier comprises a vehicle identification number (VIN).

8. The method of claim 1, wherein the identifier comprises a MAC address associated with one of a universal serial bus (USB) card or a wireless protocol card.

9. The method of claim 1, wherein a plurality of unique identifers are stored in a subsystem of the vehicle.

10. The method of claim 1, wherein the identifier is set to be operable for only a limited time period after which the vehicle is sold or leased to the user.

11. A method for enabling seamless user access to restricted content, via a wireless connection with a remote content source, for use by a user within a vehicle, the method including:
    storing an identifier in an electronic component of the vehicle, the identifier identifying that a user of the vehicle is allowed access to the restricted content, and the identifier being unrelated to the user of the vehicle;
    using a system associated with the vehicle to establish a communications link with a personal electronic device (PED) of the user after the user enters the vehicle with the PED powered on;
    using the communications link to automatically transmit the identifier to the PED, the identifier having limited time period associated therewith during which the identifier is valid;
    using the PED to transmit the identifier via a network to a remote, cloud-based authorization source;
    using the remote, cloud based authorization source to check to determine if the identifier is valid, and if so, to send an unlock code back to the PED via the network; and
    causing the PED to use the unlock code to enable an application on the PED to access and make use of predetermined content from the remote content source while the PED is present in the vehicle and being operated within the vehicle.

12. The method of claim 11, wherein establishing a communications link with a personal electronics device (PED) comprises establishing a communications link with a smartphone.

13. The method of claim 11, wherein a plurality of identifiers are stored in an electronic component of the vehicle.

14. The method of claim 11, wherein the identifier comprises at least one of a vehicle identification number (VIN) or a MAC address.

15. The method of claim 11, wherein the identifier is able to be used only for a predetermined time period after the user purchases or leases the vehicle.

16. The method of claim 11, wherein the remote content source is a cloud-based content source.

17. A system for enabling seamless user access to restricted content, via a wireless connection with a remote content source, by a user within a vehicle, the system comprising:
    a carryable personal electronic device (PED) that a user may use to access cloud-based subsystems;
    an identifier stored in an electronic component of the vehicle, the identifier identifying that a user of the vehicle is allowed access to the restricted content, and the identifier being unrelated to the user of the vehicle;
    a short range, wireless protocol connectivity system associated with the vehicle to automatically establish a wireless, short range communications link with the PED of the user when the user enters the vehicle with the PED powered on, the short range communications link automatically transmitting the identifier to the PED;
    the PED further being configured to:
    transmit the identifier to a remote authorization source;
    to receive an unlock code back from the remote authorization source if the authorization code determines that the authorization code is valid; and
    to use the unlock code to unlock an application on the PED which enables the application to access and make use of content from the remote content source.

18. The system of claim 17, wherein the PED is able to receive and transmit a plurality of identifiers stored in the electronic component of the vehicle, to the authorization source.

19. The system of claim 17, wherein the identifier comprises at least one of a vehicle identification number (VIN) or a MAC address.

20. The system of claim 17, wherein the identifier is only valid for a limited time period after the user purchases the vehicle or takes possession of the vehicle.

* * * * *